United States Patent [19]

Koike

[11] Patent Number: 4,843,914

[45] Date of Patent: Jul. 4, 1989

[54] SHIFT ASSISTING DEVICE FOR MARINE PROPULSION UNIT

[75] Inventor: Takashi Koike, Hamamatsu, Japan

[73] Assignee: Sanshin Kogyo Kabushiki Kaisha, Hamamatsu, Japan

[21] Appl. No.: 146,348

[22] Filed: Jan. 21, 1988

[30] Foreign Application Priority Data

Feb. 9, 1987 [JP] Japan .................................. 62-27774

[51] Int. Cl.[4] .............................................. B60K 41/04

[52] U.S. Cl. .......................................... 74/858; 74/872

[58] Field of Search .................. 74/858, 872, 873, 874

[56] References Cited

U.S. PATENT DOCUMENTS

| | | | |
|---|---|---|---|
| 3,667,577 | 6/1972 | Weymann | 74/858 X |
| 3,712,156 | 1/1973 | Kuhnle | 74/872 X |
| 3,814,224 | 6/1974 | Podssuweit et al. | 74/858 X |
| 4,226,141 | 10/1980 | Espenschied | 74/858 |
| 4,403,527 | 9/1983 | Mohl et al. | 74/858 X |
| 4,531,430 | 7/1985 | Holmes | 74/858 |
| 4,683,778 | 8/1987 | Pfalzgraf | 74/858 |

FOREIGN PATENT DOCUMENTS

| | | | |
|---|---|---|---|
| 579277 | 7/1931 | Fed. Rep. of Germany | 74/874 |

*Primary Examiner*—Dwight G. Diehl

*Attorney, Agent, or Firm*—Harness, Dickey & Pierce

[57] ABSTRACT

Several embodiments of shift assisting devices for marine propulsion units wherein the torque of the engine is reduced if there is resistance to shifting by reducing the amount of fuel supplied to the engine. Embodiments are depicted and described wherein this is done by throttling the intake charge or reducing the supply of fuel supplied by a fuel injection nozzle and the principle is applied to either spark ignited or diesel engines.

4 Claims, 5 Drawing Sheets

SHIFT ASSISTING DEVICE FOR MARINE PROPULSION UNIT

BACKGROUND OF THE INVENTION

This invention relates to a shift assisting device for a marine propulsion unit and more particularly to an improved arrangement for facilitating shifting without causing adverse engine operating characteristics.

In many forms of marine propulsion devices, such as outboard motors or inboard-outboard drives, there is provided a forward, neutral, reverse transmission for selectively operating the watercraft in forward, neutral or reverse conditions. Such transmissions normally employ a driving gear that is meshed with a pair of oppositely rotating driven gears that are selectively coupled to the driving shaft by means of dog clutch assemblies. The dog clutch assemblies are particularly useful in permitting the transmission of high driving loads and insuring against jumping out of gear. However, the shifting of the dog clutching elements presents some problems. For that reason, it has been the practice to provide some form of shift assist mechanism that will assist in shifting of the dog clutch into engagement by reducing the speed of the engine, if the engine speed is greater than a predetermined speed.

Normally, these shift assist mechanisms interrupt the ignition circuit of the engine to slow the engine speed during shifting operations and when the engine speed is above a predetermined value. Although such an arrangement has considerable utility, it also presents certain disadvantages under some circumstances. For example, this type of device may complicate the ignition circuit. In addition, even though the engine speed is slowed by interrupting the engine firing, there is the problem of unburned fuel that enters into the combustion chambers and then is exhausted through the exhaust system. Backfires can frequently occur with arrangements of this type due to the passage of large quantities of unburned fuel into the exhaust system, particularly when the engine speed is returned to normal.

It is, therefore, a principal object of this invention to provide an improved shift arrangement for a marine propulsion device.

It is a further object of this invention to provide an improved arrangement for assisting in shifting in a marine propulsion device without causing backfiring.

The aforenoted type of systems for shift assisting, as have been noted, require the use of ignition interruption. However, in certain types of engines such as diesel engines, there is not an ignition system per se. Therefore, the type of shift assist device previously employed cannot be utilized with diesel engine marine units.

It is, therefore, a further object of this invention to provide an improved shift assisting device that may be utilized with a wide variety of engine types including diesel engines.

SUMMARY OF THE INVENTION

This invention is adapted to be embodied in a shift assisting mechanism for a marine propulsion unit having an engine, a drive shaft and transmission means for coupling the engine to the drive shaft at selected ratios. The transmission means includes operator controlled shifting means for effecting changes in the transmission ratio. The engine includes fuel control means for supplying fuel to the engine for combustion. In accordance with the invention, means are provided for sensing operation of the operator controlled shifting means to effect a change in transmission ratio and means for reducing the supply of fuel to the engine by the fuel control means in response to a sensed operation of the operator controlled shifting means for reducing the torque of the engine and facilitating shifting.

DETAILED DESCRIPTION OF THE PREFERRED EMBODIMENTS

Figure 1:
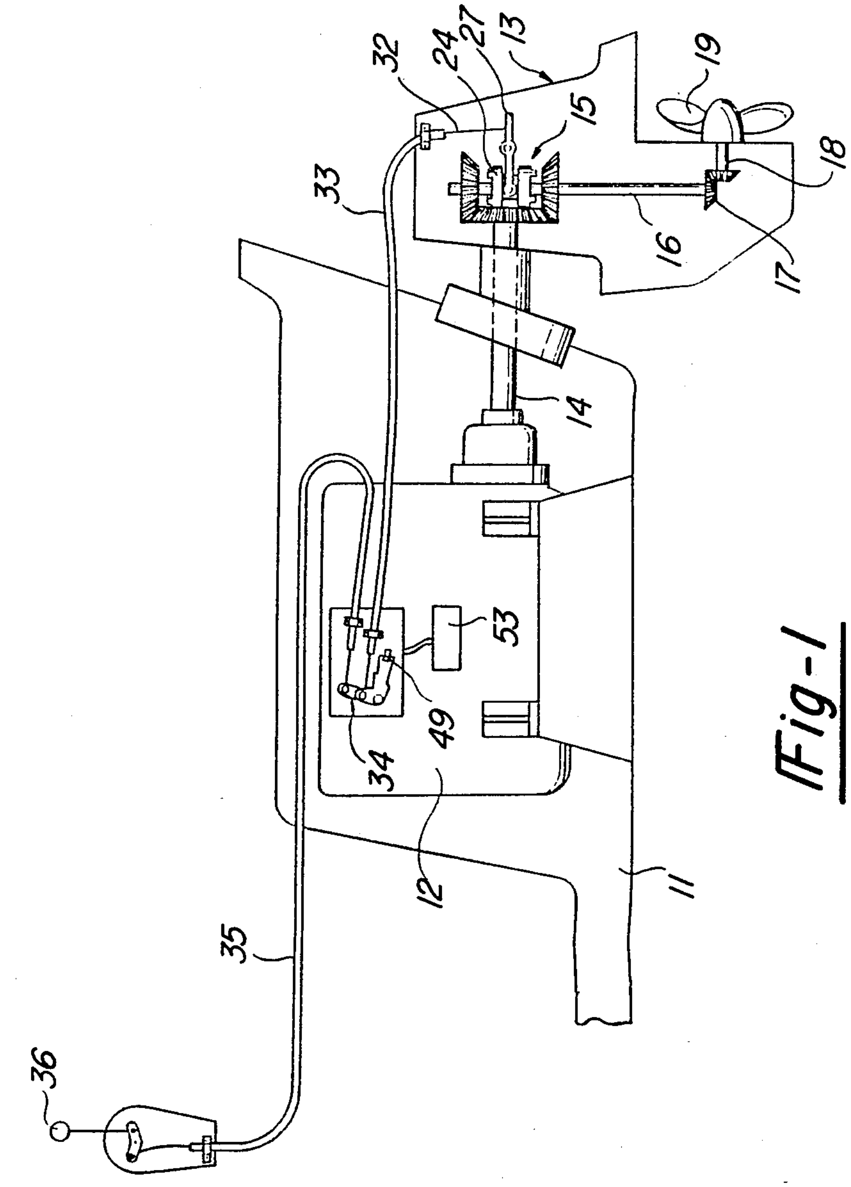
FIG. 1 is a partial, partially schematic, side elevational view of a watercraft having a marine propulsion unit constructed in accordance with an embodiment of the invention.

Referring first to FIG. 1, a typical environment in which the invention may be employed is depicted. There is illustrated a watercraft hull 11 that is powered by an inboard-outboard drive arrangement including a powering internal combustion engine 12 that drives an outboard drive assembly 13 through a drive shaft 14. The drive shaft 14 extends from the engine 12 through the hull of the watercraft to the outboard drive unit 13. The outboard drive unit 13 is mounted for steering movement relative to the hull 11 about a generally vertically extending axis and for tilting movement about a generally horizontally extending axis in a known manner.

A forward, neutral, reverse transmission 15 is provided in the outboard drive unit 13 for driving a vertically extending driven shaft 16. A bevel gear train 17 at the lower end of the driven shaft 16 drives a propeller shaft 18 and propeller 19 for propelling the hull 11 through the water.

Figure 2:
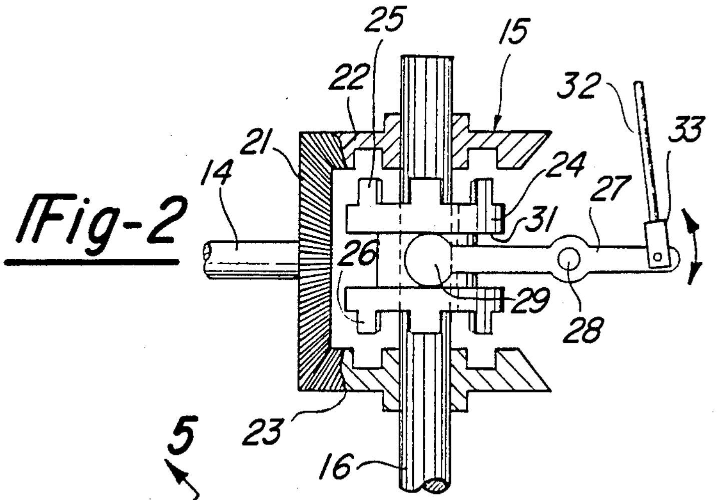
FIG. 2 is an enlarged cross-sectional view showing the shifting device of the transmission.

The forward, neutral, reverse transmission 15 is best depicted in FIG. 2. As seen in this figure, a driving bevel gear 21 is affixed to the drive shaft 14 and meshes with a pair of diametrically opposed, driven bevel gears 22 and 23. Because of their diametrically opposite disposition, the gears 22 and 23 will rotate in opposite directions. The gears 22 and 23 are journaled upon the driven shaft 16 and a dog clutching arrangement is provided for selectively coupling either of the gears 22 or 23 for rotation with the driven shaft 16 for driving it in selected forward or reverse directions.

The dog clutching mechanism includes a dog clutching sleeve 24 that has a splined connection to the driven shaft 16 and which is axially slidable along it. Pairs of oppositely facing dog clutching teeth 25 and 26 face the driven bevel gears 22 and 23, respectively. FIG. 2 shows the mechanism in a neutral position wherein the dog clutching teeth 25 and 26 are clear of complementary teeth formed on the gears 22 and 23 so that the drive shaft 14 will rotate freely while the driven shaft 16 will not be driven. However, if the dog clutching teeth 25 are moved into contact with the complementary teeth on the bevel gear 26, the driven shaft 16 will be rotated in a forward direction. If the dog clutching teeth 26 are moved into engagement with the complementary teeth on the driven bevel gear 23, the driven shaft 16 will be rotated in a reverse direction.

A shift lever 27 is pivotally supported on a pivot pin 28 and has an enlarged portion 29 that is received within a circumferential recess 31 of the dog clutching sleeve 24 for effecting its axial movement along the shaft 16 upon pivotal movement fo the shift lever 27. The shifting lever 27 is connected to a push-pull cable 32 by means of a clevis 33.

Figure 3:
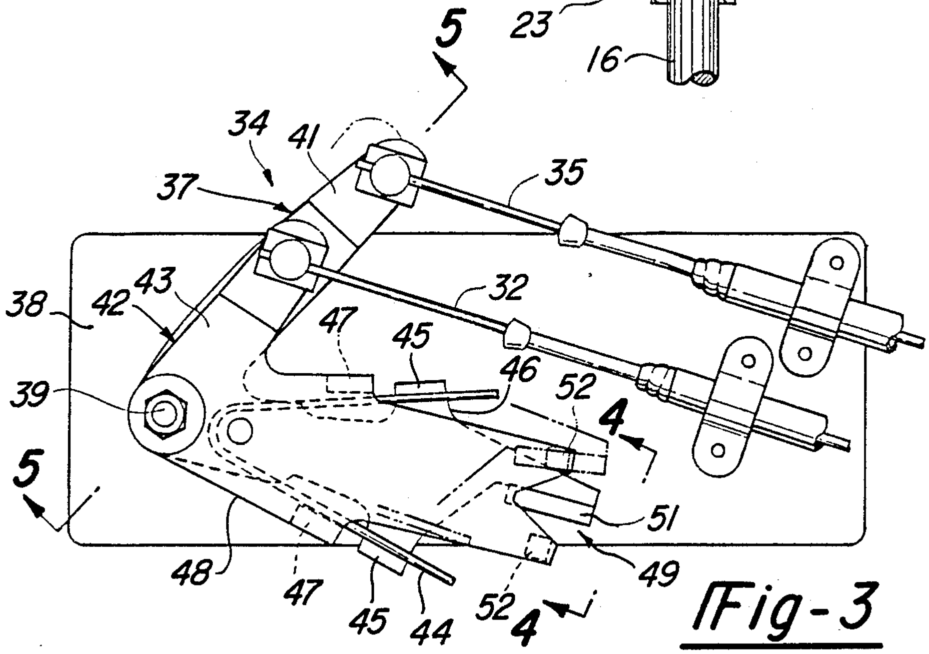
FIG. 3 is an enlarged side elevational view of the shift detecting mechanism.
Figure 4:
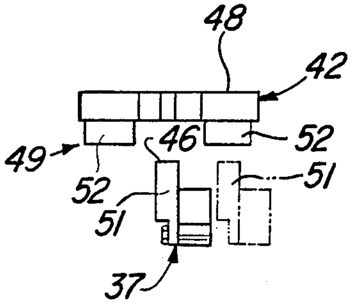
FIG. 4 is a cross-sectional view taken along the line 4—4 of FIG. 3.
Figure 5:
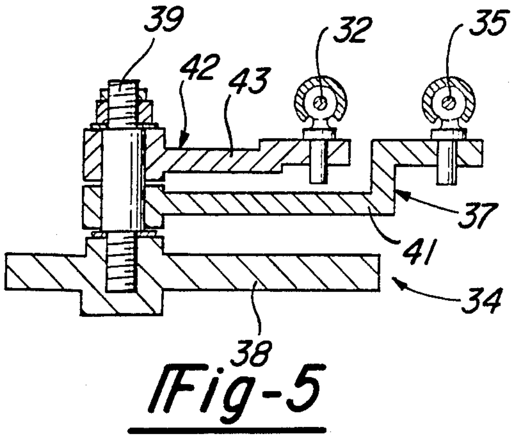
FIG. 5 is a cross-sectional view taken along the line 5—5 of FIG. 3.

Referring again to FIG. 1, it will be seen that the push-pull cable 32 extends through a protective sheath 33 to a shift detecting mechanism, indicated generally by the reference numeral 34, which is mounted within the hull 11 and may be mounted on a side of the engine 12. The shift detecting mechanism 34 has a construction as best shown in FIGS. 3 through 5 and which will be described shortly. A push-pull cable assembly 35 is also connected to the shift detecting mechanism 34 at one end and to an operator controller shift lever 36 at its opposite end so as to effect shifting of the transmission 15.

Referring now primarily to FIGS. 3 through 5, the shift detecting mechanism 34 is comprised of a first bellcrank, indicated generally by the reference numeral 37 and which is pivotally journaled on a mounting plate 38 by means of a pivot pin 39. As has been previously noted, the mounting plate 38 may be conveniently mounted to the engine 12. The wire transmitter 35 is connected to an arm 41 of the bellcrank 37 for pivoting the bellcrank 37 upon actuation of the operator controlled shift lever 36.

A second bellcrank, indicated generally by the reference numeral 42, is also pivotally supported by the pivot pin 39 and, hence, pivots about the same axis as the bellcrank 37. The flexible transmitter 32 is connected at one end to one arm 43 of the bellcrank 42 so as to effect movement of the shift lever 37 upon pivotal movement of the bellcrank 42.

A resiliently biased lost motion connection is provided between the bellcranks 37 and 42. This connection is provided by means of a hair pin shaped spring 44 that has its legs loaded between a first pair of lugs 45 formed on the other leg 46 of the bellcrank 37 and a second pair of lugs 47 formed on the other leg 48 of the bellcrank 42. The spring 44 normally has sufficient rigidity so as to effect simultaneous pivotal movement of the bellcranks 37 and 42 upon operator actuation of the shift lever 36 for operating the shifting lever 37 and shifting the transmission 15. However, if there is substantial resistance to the engagement or disengagement of the dog clutching teeth 25 or 26 with the corresponding teeth of one of the driven bevel gears 22 or 23, the spring 44 will yield and permit some relative rotation between the bellcranks 37 and 42 until the dog clutching teeth can move into or out of engagement.

A detector, indicated generally by the reference numeral 49, is provided for sensing when relative movement occurs between the bellcranks 37 and 42 and, accordingly, when there is a resistance to shifting. The detector 49 includes a detecting device 51 that is mounted on the arm 46 of the bellcrank 37. The arm 48 of the bellcrank 42 is bifurcated and carries a pair of small permanent magnets 52. When relative movement occurs between the bellcranks 37 and 42, the detector 51 will move into proximity with one of the permanent magnets 52 as shown in the phantom line in FIGS. 3 and 4. At this time, the detector 51, which turns "on" at such time, will emit a signal to indicate that there is resistance to shifting. This signal is transmitted to a shift assist mechanism, indicated generally by the reference numeral 53 (FIG. 1), for reducing the torque of the engine so as to assist in shifting.

Figure 6:
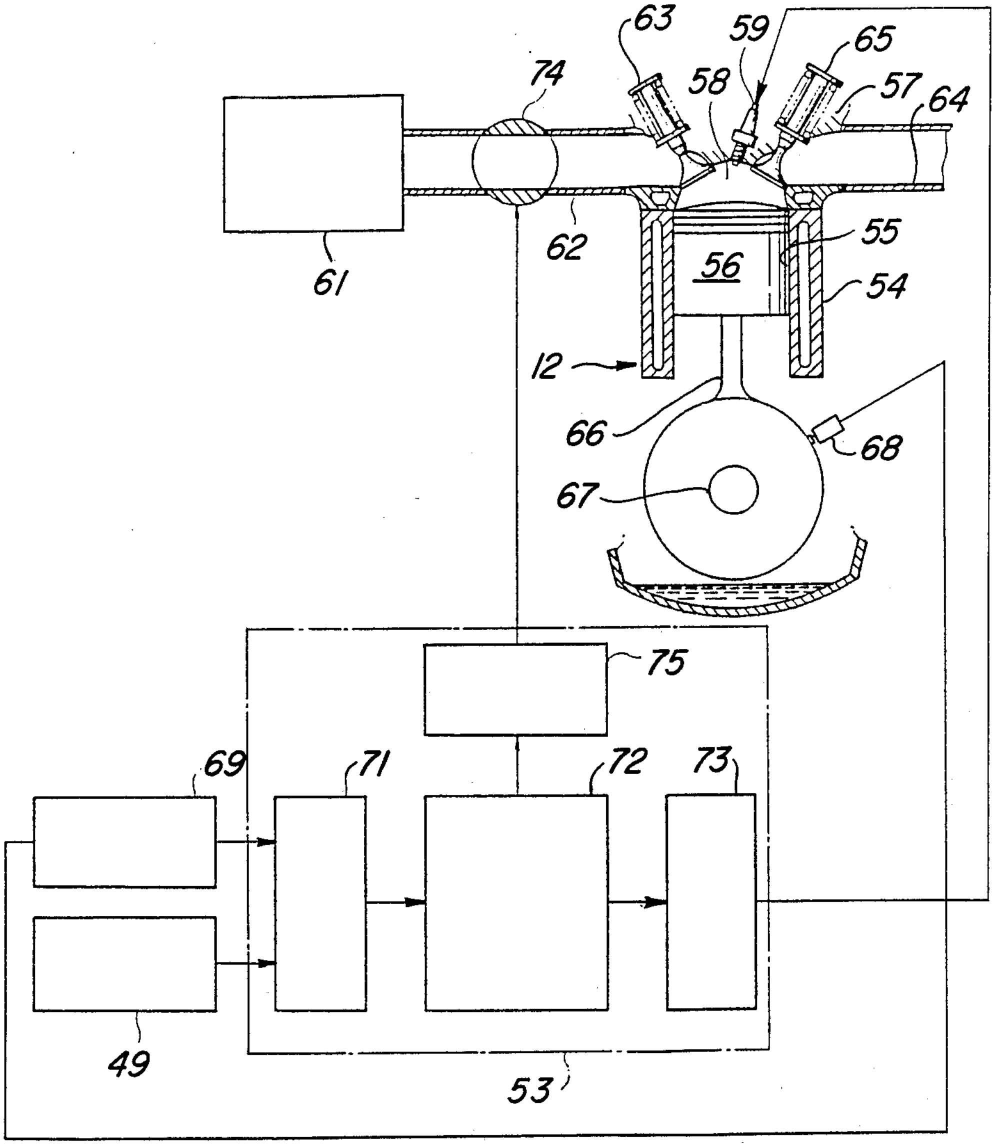
FIG. 6 is a schematic view showing the construction of the mechanism for reducing engine torque and its relationship to the engine.

The shift assist mechanism 53 may be best understood by reference to FIG. 6 wherein the engine 12 is depicted in partial cross-section. The engine 12 includes a cylinder block 54 having a cylinder bore 55 in which a piston 56 reciprocates. A cylinder head 57 is affixed to the cylinder block 54 and defines a combustion chamber 58 with the cylinder bore 55 and piston 56. In this embodiment of the invention, the engine 12 is of the spark ignited type and a spark plug 59 is supported within the cylinder head 57 and has its gap disposed in the combustion chamber 58 for firing a charge at the appropriate time interval.

A carburetor 61 is provided for delivering a fuel/air charge to the combustion chamber 58 through an intake passage 62. An intake valve 63 controls the communication of the intake passage 62 with the combustion chamber 58 in a known manner. There is also provided an exhaust passage 64 through which the exhaust gases are discharged to the atmosphere and an exhaust valve 65 controls the communication of the combustion chamber 58 with the exhaust passage 64 in a known manner.

The piston 56 is connected by means of a connecting rod 66 to a crankshaft 67 for driving the crankshaft 67 in a known manner. A pulser coil 68 cooperates with the crankshaft 67 for generating a pulse at the appropriate time which pulse is delivered to a circuit shown schematically at 69 which provides an output signal indicative of engine speed as well as crankshaft angle. The circuit 69 outputs a signal to an interface 71 that conveys this information to a micro computer 72. The micro computer 72 outputs information to an ignition circuit 73 for firing the spark plug 59.

In order to reduce the torque of the engine 12 to assist in shifting, there is provided a throttle valve 74 in the intake passage 62 for reducing the amount of fuel supplied to the combustion chamber 58 and, accordingly, its torque. Rather than using a separate throttle valve 74, the throttle valve of the carburetor 61 may be employed as a torque reducing device or, alternatively, the amount of fuel supplied by the carburetors 61 may be reduced to reduce the torque. Such other torque reducing devices are believed to be well within the scope of those skilled in the art.

When the detecting device 51 moves into proximity with one of the permanent magnets 52 due to resistance to shifting, a signal is outputted from the shift detector 49 to the interface 71 and computer 72. The computer 72 determines if the engine is operating at a greater than a predetermined speed, in accordance with a program to be described and, if so, outputs a signal to a drive circuit 75 that operates the throttle valve 74 so as to reduce the speed of the engine. When the speed has been reduced sufficiently, the system will return the throttle 74 to its normal fully opened condition.

Figure 7:
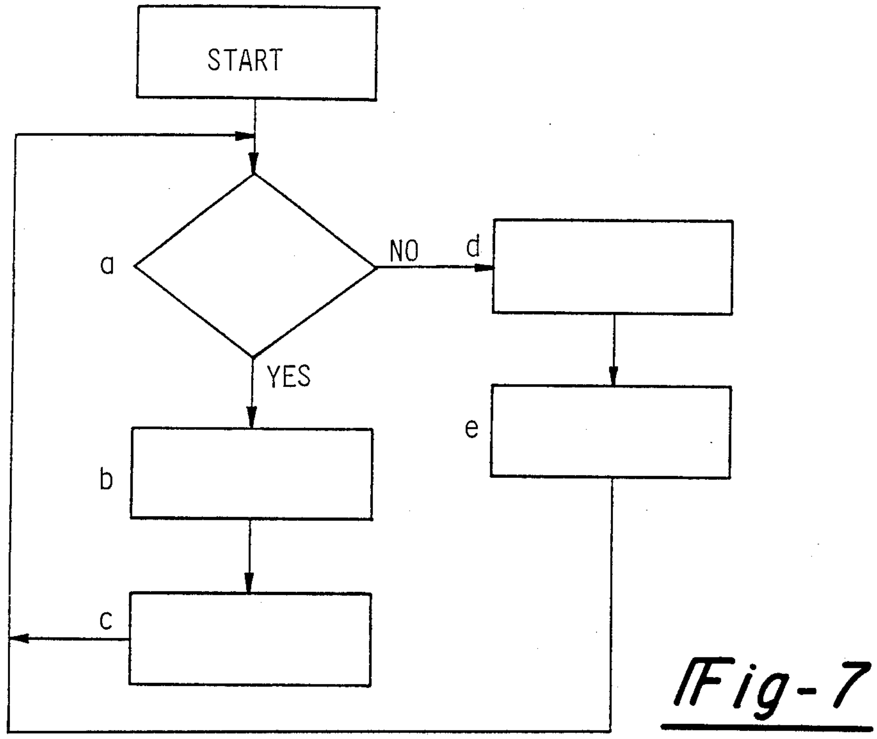
FIG. 7 is a block diagram showing the logic for effecting torque reduction.

The logic by which the micro computer 72 operates is shown in FIG. 7. When the program is started, the micro computer determines at the step a whether or not the engine speed is in excess of a predetermined minimum engine speed. If the engine speed is greater than the predetermined engine speed, the micro computer at the step b produces an output signal to close the throttle valve 74 at the step c. The program then returns to the step a to determine if the engine speed has been reduced below the predetermined engine speed. If the engine speed has not been so reduced, the throttle valve is further closed through the steps b and c, as aforedescribed.

If, however, it is determined at the initial condition or after the throttle valve 74 has been activated that the speed of the engine is below the predetermined speed, the program moves to the step d wherein the circuit 75 is actuated at the step e to effect opening of the throttle valve.

The reason why the engine speed is only reduced to a predetermined engine speed and not full idle speed is to insure against stalling of the engine. It should be noted that the aforedescribed operation has made reference to the shifting of the transmission 15 into one of the forward or reverse gears. It should be understood, however, that the same effect will occur if there is resistance to shifting out of either forward or reverse as the bellcranks 37 and 42 will rotate relative to each other upon resistance either to shifting into gear or out of gear and the engine speed will be reduced under either occurrence. Also, the engine speed is reduced by reducing the fuel supply to the engine rather than by interrupting its ignition circuit and, therefore, there will be no likelihood of backfiring occurring.

Figure 9:
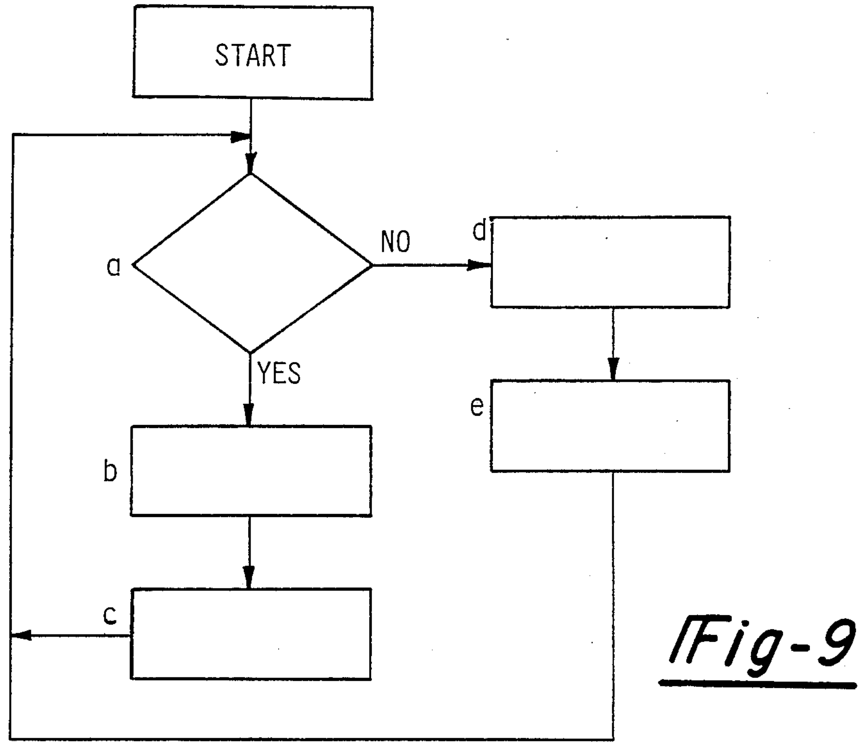
FIG. 9 is a block diagram showing the logic of operation of the embodiment of FIG. 8.
Figure 8:
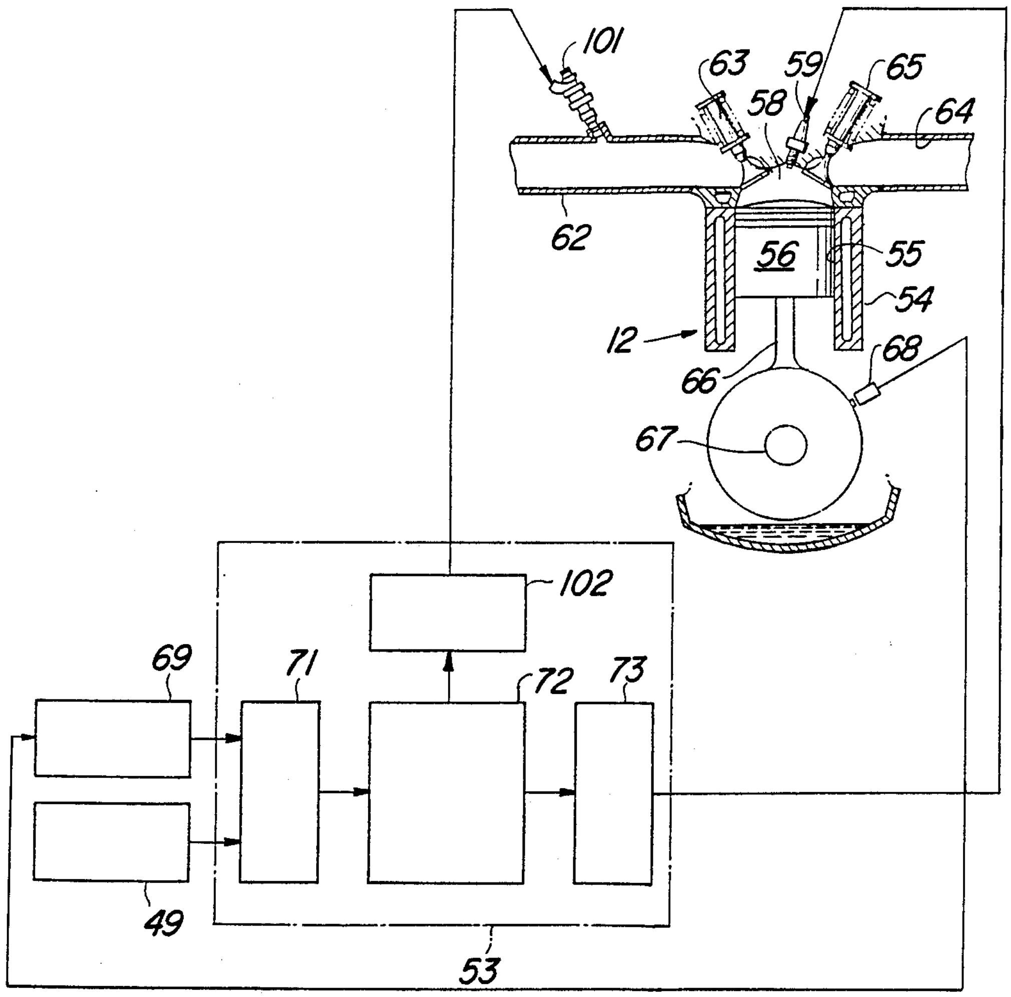
FIG. 8 is a partially schematic view, in part similar to FIG. 6, showing another embodiment of the invention.

Up to this point, the invention has been described in conjunction with a carbureted spark ignited internal combustion engine. It is to be understood that the invention may also be employed in conjunction with a fuel injected spark ignited engine or in conjunction with a diesel engine. The application of the principle to a fuel injected engine is depicted in FIGS. 8 and 9. The basic construction of the engine is the same as that previously described and, hence, those components which are the same have been identified by the same reference numerals and will not be described again except insofar as may be necessary to understand the construction and operation of this embodiment.

In this embodiment, no carburetor is provided and fuel is supplied to the combustion chamber 58 by means of a fuel injection nozzle 101 that is disposed in the intake passage 62. The amount and timing of fuel delivered from the fuel injection nozzle 101 is controlled electronically by means of a drive circuit 102 that receives crank angle signals from the detector 68 through the circuit 69, interface 71 and micro computer 72. Such fuel control devices are well known. In accordance with this embodiment, however, when the shift detector 49 indicates a resistance to shifting, a signal will be input to the micro computer 72 through the interface 71. If the micro computer 72 determines that the engine speed is above a predetermined speed in accordance with a program to be described, the amount of fuel supplied from the injection nozzle 101 by the driving circuit 102 will be reduced so as to lower the engine torque.

Referring now to FIG. 9, the logic of the computer by which the amount of fuel delivered from the fuel injection nozzle is reduced will be described. Once the program starts, at the step a, it is determined if the engine speed is above the predetermined speed. If so, at the step b, the micro computer 72 will output a signal to the control device so that the control device at the step c will produce a reduction in the amount of fuel delivered from the fuel injection nozzle 101. The program then moves back to the step a to determine if the engine speed has been reduced below the predetermined engine speed. If not, the sequence is repeated until the engine speed has been reduced below the predetermined engine speed.

If the engine speed is either below the predetermined engine speed at the initial beginning of the program or after it has been reduced below the predetermined speed, at the step a, the program moves to the step d wherein the micro computer 72 outputs a control signal at the step e so as to return the amount of fuel supplied by the fuel injector nozzle 101 to its normal fuel delivery.

Even though the embodiment of FIGS. 8 and 9 have been described in conjunction with a spark ignited fuel injected engine, it is believed that this embodiment clearly discloses to one skilled in the art how the invention can be utilized in conjunction with a diesel engine having fuel injection.

It should be readily apparent from the foregoing description that a number of embodiments of the invention have been illustrated and described, each of which is highly effective in facilitating shifting in a transmission of the type having dog clutches through reduction of the engine torque by reducing the amount of fuel supplied to the engine rather than by interrupting its ignition. In this way, shifting if facilitated without causing backfiring as might occur if the engine speed were reduced by interrupting the engine. Although the system is described with an inboard-outboard drive, it obviously can be used with an outboard motor per se. Also, this invention is adapted to be utilized in conjunction with shift assisting with diesel engines where there is no ignition system. Although a number of embodiments of the invention have been illustrated and described, various changes and modifications may be made without departing from the spirit and scope of the invention, as defined by the appended claims.

I claim:

1. In a shift assisting mechanism for a marine propulsion unit having an engine, a drive shaft, and transmission means for coupling said engine to said drive shaft at selected ratios, said transmission means including operator controlled shifting means for effecting changes in the transmission ratios, said engine including fuel control means for supplying fuel to said engine for combustion, the improvement comprising means for sensing a predetermined resistance to the operation of said operator controlled shifting means to effect a change in transmission ratio and means for reducing the supply of fuel to said engine by said fuel control means in response to a sensed predetermined resistance to the operation of said operator controlled shifting means for reducing the torque of said engine and facilitating shifting.

2. In a shift assisting mechanism as set forth in claim 1 wherein the means for reducing the supply of fuel comprises means for throttling the intake charge to the engine.

3. In a shift assisting mechanism as set forth in claim 1 wherein the means for reducing the supply of fuel to the engine comprises means for reducing the supply of fuel from a charge forming device.

4. In a shift assisting mechanism as set forth in claim 3 wherein the charge forming device comprises a fuel injection nozzle.

* * * * *